March 1, 1932.   F. H. OWENS   1,847,535
APPARATUS FOR REPRODUCING PHOTOGRAPHIC SOUND RECORDS
Filed March 20, 1929
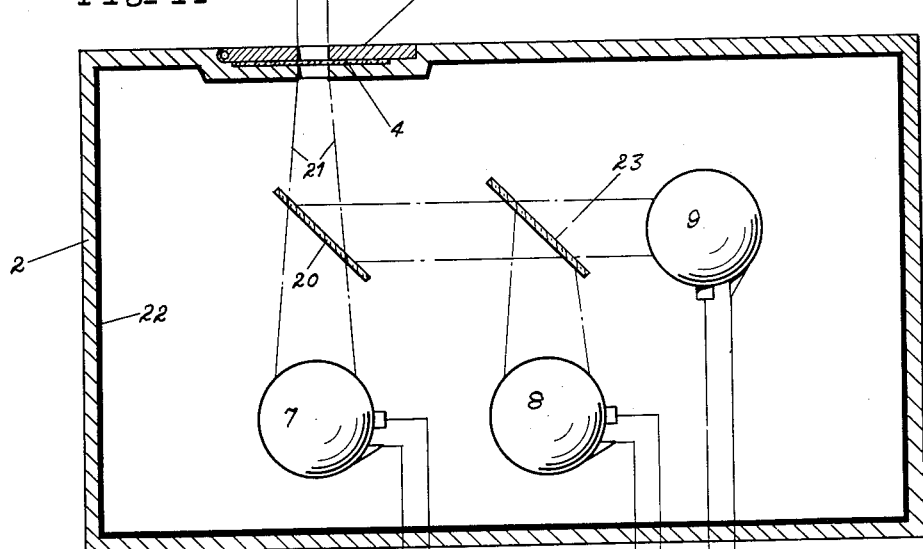
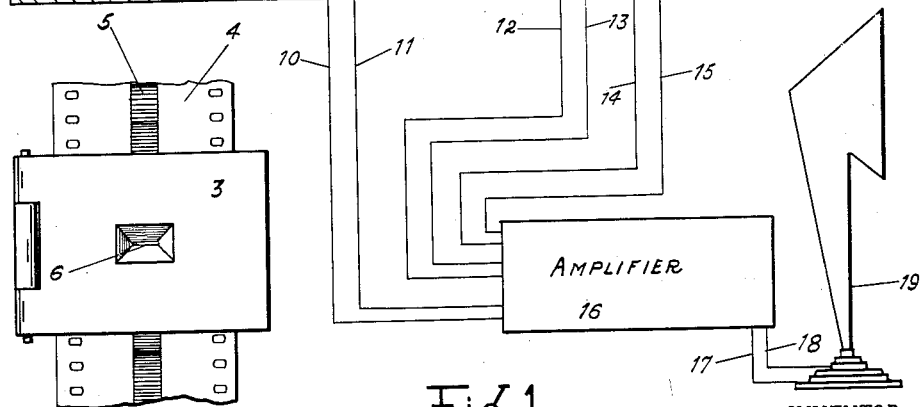
INVENTOR.
FREEMAN H. OWENS.
BY Philip S. Hopkins
ATTORNEY Patented Mar. 1, 1932

1,847,535

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

APPARATUS FOR REPRODUCING PHOTOGRAPHIC SOUND RECORDS

Application filed March 20, 1929. Serial No. 348,640.

The present invention relates to an improved apparatus for reproducing photographic sound records, the principal object of the invention being to provide means for utilizing the rays of light from the reproducing lamp ordinarily employed so as to obtain maximum efficiency whereby the volume of reproduced sound from the film or other record-carrying member is considerably increased.

In sound reproducing apparatus in which a beam of light is projected through a film or other suitable member having sound modulated light rays photographed thereon, I have discovered that considerably better results are obtained if, instead of projecting the entire beam of modulated light to a single photo-electric cell as heretofore, some means is provided for "splitting" the beam after its passage through the film and directing the split-off rays to auxiliary photo-electric cells, all of said cells being electrically connected with a common amplifier. The object of the present invention, therefore, is to provide an apparatus having means whereby not only is the desired splitting of the beam of light accomplished in a practical and extremely efficient manner, but in case of the failure of either of the photo-electric cells to function, the apparatus will continue to operate through the intervention of the remaining cells.

With the foregoing and other objects in view, which will appear as the description proceeds, the invention consists in the novel features of construction and combination of parts which will be more fully described hereinafter and particularly pointed out in the claims.

In the drawings accompanying this specification,

Fig. 1 is a diagrammatic plan view illustrating an apparatus embodying the features of the present invention, parts being shown in section;

Fig. 2 is a fragmentary side view of a film record showing the slit in the supporting gate through which the light rays are projected;

Fig. 3 is a plan view of one form of a reflecting member forming a part of the improved apparatus; and Fig. 4 is a plan view of a modified form of the same member.

Referring to the drawings, 1 designates the usual reproducing lamp from which light is usually projected through an optical system, not shown, disposed between the lamp and a travelling film on which the sound modulations have been photographed. In the present instance, I have shown a housing 2, in one side of which is formed a seat for the reception of the usual gate 3 through which passes the travelling film 4 having the modulations photographed thereon as indicated at 5 in Fig. 2, the gate being provided with a narrow slit 6 and which slit is directly in the path of the light projected from the lamp 1. Supported within the housing 2 are a plurality of photo-electric cells 7, 8 and 9, which cells are suitably connected by pairs of wires 10—11, 12—13, and 14—15 respectively with a common amplifier 16, the latter being in turn connected by wires 17, 18 with a loud speaker 19.

As shown in Fig. 1, the photo-electric cell 7 is disposed directly in the path of the light after it has passed through the film and has been modulated thereby, while the cells 8 and 9 are disposed at one side of said path. In order to split the light, thereby to divert some of its rays toward the cell 9, I have mounted in the path of projection, between the film and the cell 7 a transparent member 20, which may be of glass or other suitable material, said member being disposed at such an angle as to deflect some of the rays of light 21 toward the photo-electric cell 9. When the member 20 is made of transparent material, in order to produce such deflection of the rays, it will be necessary to provide a light-absorbing curtain or screen, and for this purpose I have shown the housing 2 lined throughout with a black material 22. By this construction, a certain amount of the light striking the transparent plate will be deflected laterally toward the photo-electric cell 9, the remaining rays passing through the plate and being caught by the cell 7. In the path of the rays deflected toward the cell 9, I have disposed a second transparent or plain glass deflecting member 23, which, owing to the black screen or curtain provided by the lining of the housing, will in turn deflect some of said rays toward the photo-electric cell 8, the remaining rays passing through the member 23 and being caught by the cell 9.

In the form of the deflecting member shown in Fig. 3, this member 24 is provided with a central transparent opening 24ᵃ of sufficient diameter to permit the passage of a substantial portion of the light rays. The member may in this case be a mirror provided with the transparent spot or section 24ᵃ.

In Fig. 4 still another form of the deflecting member is shown. In this form the member comprises a number of strips 25 spaced apart in a frame 25ᵃ so as to permit free passage of some of the rays of light, the strips 25 being either mirrors or merely provided with reflecting surfaces for deflecting the remaining rays in the manner hereinbefore described.

From the foregoing it will be seen that I have provided an apparatus in which the rays of modulated light are split or divided within the housing and distributed toward the three photo-electric cells, and that the cells are connected to a common amplifier, whereby the modulated light rays are utilized to the best possible advantage.

While I have described in detail the apparatus herein illustrated, it is to be understood that I do not thereby limit my invention to the precise features of construction shown, as I am aware that certain modifications may be made therein without departing from the spirit and scope of the invention as set forth in the claims appended hereto.

Having thus described my invention, what I claim is:

1. An apparatus of the character described, comprising, in combination, a housing, means for projecting rays of sound modulated light into said housing, a plurality of photo-electric cells disposed within the housing in different positions relatively to the path of said light rays, means for passing some of said light rays directly to one of said cells and for reflecting some of the rays of light toward each of the other cells, a common amplifier electrically connected with all of said cells and means for rendering audible the translated impulses of all of said cells.

2. An apparatus of the character described, comprising, in combination, a housing, means for projecting rays of sound modulated light into said housing, a photo-electric cell disposed in the path of said light rays, a second photo-electric cell disposed at an angle to said path, means disposed in the path of said light rays and adapted to deflect some of the rays toward said second cell and permit passage of the remaining rays to said first cell, a third photo-electric cell disposed at an angle to the path of said deflected rays, means in said path and adapted to deflect some of the rays toward said third cell and permit passage of the remaining rays to said second cell, a common amplifier electrically connected with all of said cells, and means for rendering audible the translated impulses of said cells.

In testimony whereof, I affix my signature.

FREEMAN H. OWENS.